June 11, 1929.  W. H. KIRBY  1,717,225
AUTOMOBILE SIGNALING SWITCH
Filed March 10, 1926  3 Sheets-Sheet 1

WITNESSES

INVENTOR
William H. Kirby
BY
ATTORNEYS

June 11, 1929. W. H. KIRBY 1,717,225
AUTOMOBILE SIGNALING SWITCH
Filed March 10, 1926 3 Sheets-Sheet 2
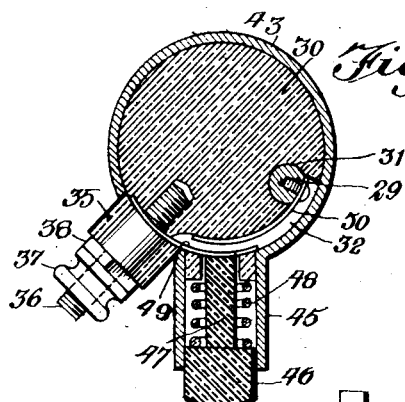
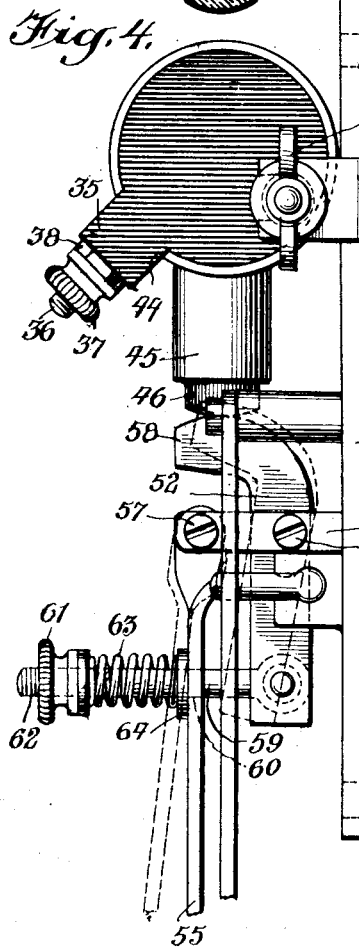
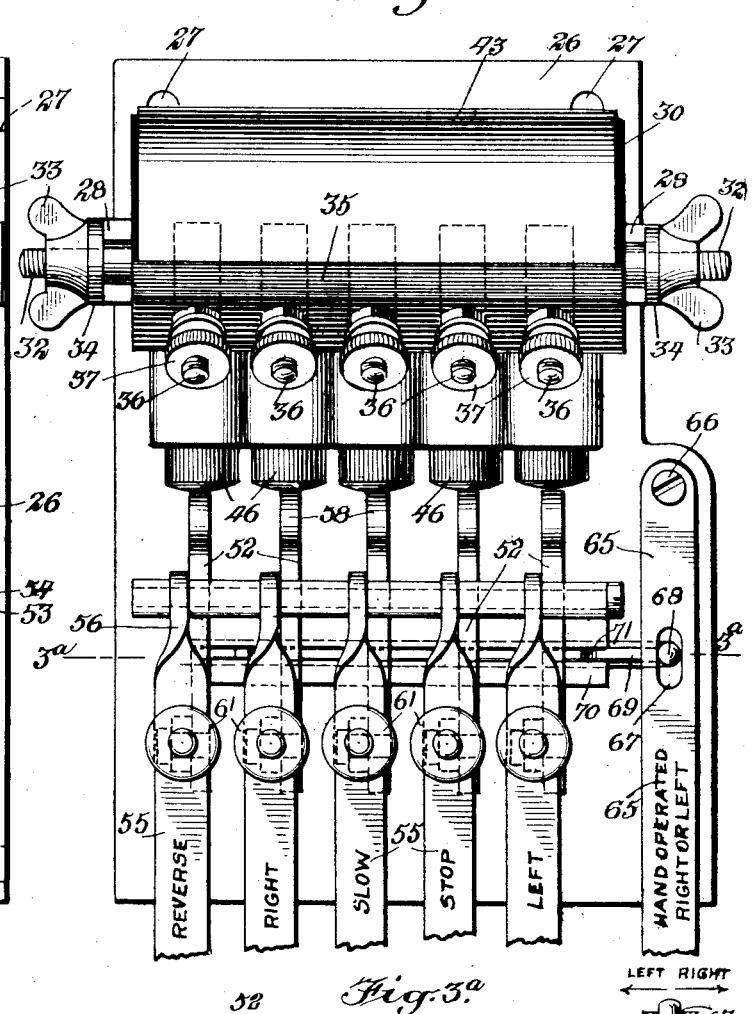
WITNESSES
INVENTOR
William H. Kirby
BY
ATTORNEYS

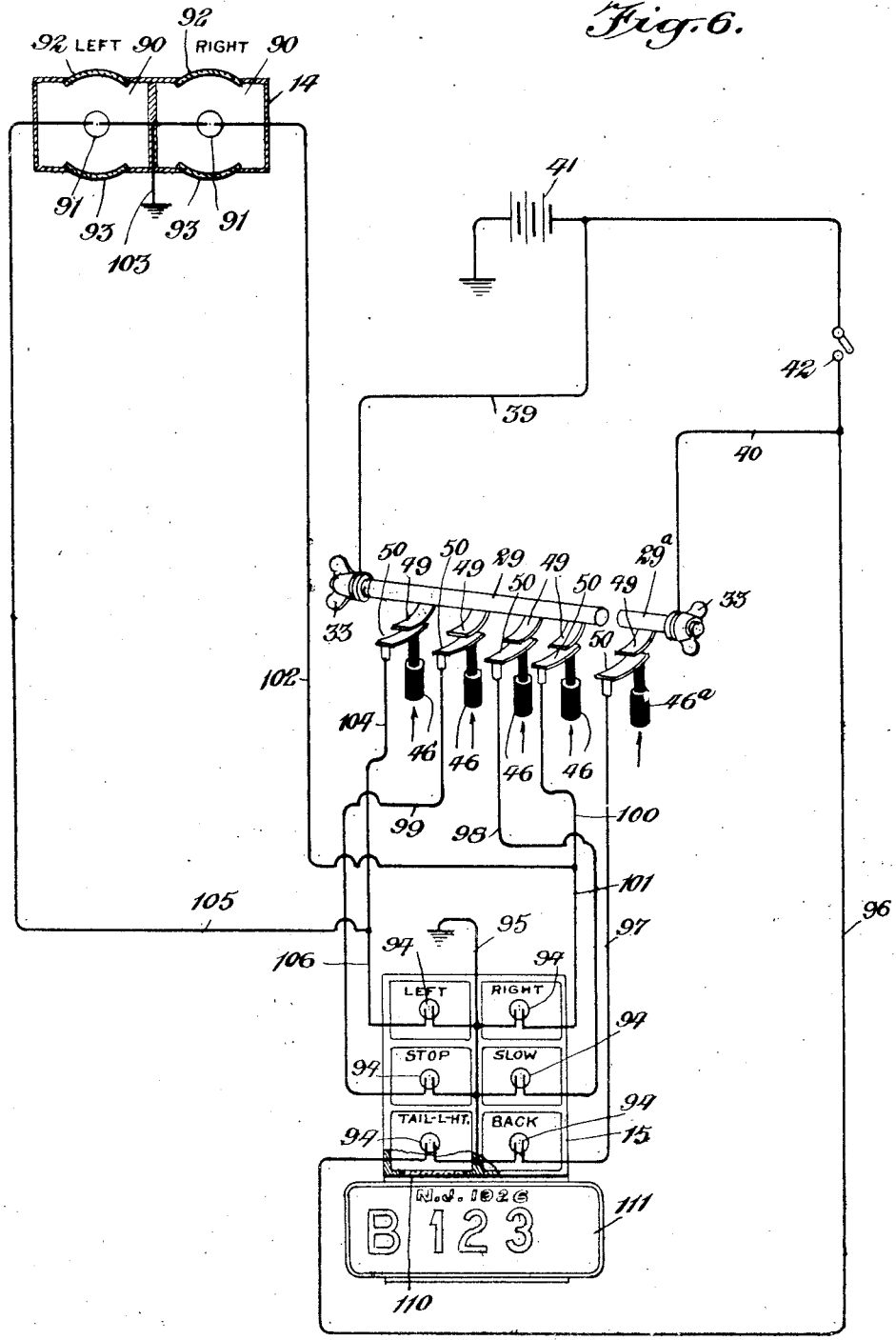

Patented June 11, 1929.

1,717,225

UNITED STATES PATENT OFFICE.

WILLIAM H. KIRBY, OF BEVERLY, MASSACHUSETTS.

AUTOMOBILE SIGNALING SWITCH.

Application filed March 10, 1926. Serial No. 93,684.

The present invention is concerned with the provision of a signaling apparatus for automotive vehicles so constructed that the driver of a car will have at his command means for indicating to the drivers of approaching cars and of following cars, every move which he intends to make.

Preferably the signaling apparatus includes signal casings mounted upon both the front and rear fenders. The front signal casing includes means for indicating both right and left hand turns. The rear casing displays indicia which when properly illuminated will indicate an intention to turn right or left, to slow down, to stop or to reverse.

The signaling apparatus is semi-automatic in operation, with the exception of the right and left hand signals which may be selectively manually or pedally controlled by the driver. The stop signal, slow signal and reverse signal are controlled from the clutch, foot brake, and gear shift lever respectively, so that when a driver of a car performs the usual operations necessary to slow down, stop or reverse, his intentions will be signalled to the driver of a following car.

One feature of the invention is the provision of a common switch box through which all of the signal lights are controlled.

Another feature of the invention is the use of switch operating levers and linkage so mounted, that they will in no way interfere with the normal operation of the foot control pedals or gear shift lever, and for the most part will be concealed from view and mounted beneath the floor boards of a car.

A further feature of the invention is an arrangement which permits the reverse signal to operate only at night when the tail light is lit. I have found that in the day time the reverse signal is usually unnecessary, and therefore, so arrange it that it only operates when the tail light switch is closed.

Further objects of the invention are to provide a switching mechanism, signal casing construction, and switch controlling linkage which will be of simple, practical construction, which will be rugged, durable and efficient in use, which may be manufactured with comparative economy, and which may be conveniently applied to a standard car without requiring any material alterations in the construction of the car. A feature of the invention is the fact that it may be added to a manufactured car almost as cheaply and conveniently as it may be built into a car during its manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein Fig. 1 is a view in side elevation of an automotive vehicle equipped with signaling mechanism embodying the present invention, parts of the automobile body being broken away and in section to illustrate the control mechanism for the signal switches.

Fig. 3 is a plan view of a switching mechanism for controlling the energization of the various signal lights. In this view the ends of the control levers have been broken away.

Figure 1:
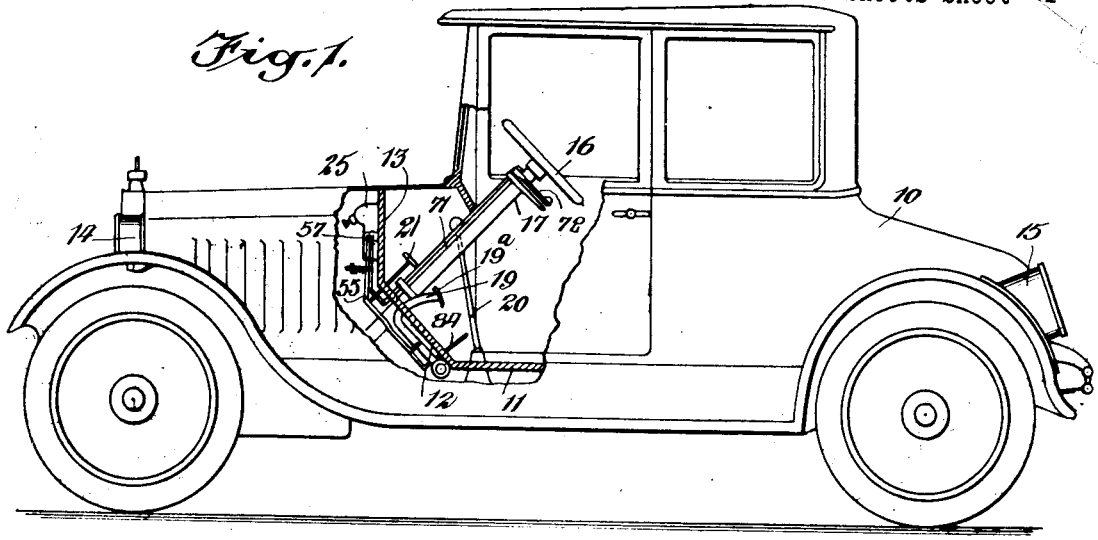

Fig. 3$^a$ is a view in section through Fig. 3.

Fig. 4 is a view in side elevation of the switching mechanism shown in Fig. 5, the dotted lines indicating the position of a switch control lever and a circuit closing bell crank lever at the time one of the signal light circuits is closed.

Fig. 5 is a transverse sectional view on the line 5—5 of Fig. 3.

Fig. 6 is a wiring diagram.

In the particular embodiment of the invention illustrated in the accompanying drawings, I have elected to show the manner in which the signaling mechanism of the present invention may be conveniently applied to a standard make of automobile. It will be obvious that when a mechanism is built into a car, numerous minor refinements, particularly in the arrangement of the switch controlling means may be found expedient.

In the drawings I have used the reference character 10 to designate an automobile equipped with the usual floor board 11 under the driver's seat, from which rises the customary inclined foot board 12 connected at its upper end to a dash board 13. Mounted on the front mud guard of the vehicle is a signal casing 14, and on the rear mud guard of the vehicle, a signal casing 15, the structural details of which are subject to a wide variety of variations.

The steering wheel designated at 16 is mounted upon the usual column 17. A brake lever 18 carrying the usual pedal 18ª, and a clutch lever 19 carrying the usual pedal 19ª are connected in a conventional manner to pivot shafts 18ᵇ, 19ᵇ below the floor boards, the levers projecting upwardly through the foot board 12 as is well understood in the art. The gear shift lever has been designated by the reference character 20, and it may be assumed that this lever controls what is commonly referred to as the standard gear shift in which a forward movement of the lever is used to place the car in reverse gear.

In addition to the usual levers 18 and 19, I provide a pair of supplementary pedals 21 and 22 disposed forwardly of the levers 18 and 19, and rigidly connected to pull bars 23 and 24 for operating the right and left signal lights as will be later described.

Before entering into a description of the linkage and lever trains by which the foot pedals and gear shift lever control the various signal lights, I shall describe the switching mechanism which is used to control the establishment of circuits through the signal lights. This switching mechanism has been simplified in many respects, and the switches for all of the signal lights are used to establish a circuit through a common conductor from the battery.

The switching mechanism may be mounted in any convenient location, and for the sake of illustration I have shown a switch casing 25 secured upon the dash board 13. The location of this casing at other points would involve certain changes in the switch operating levers, or might involve the use of relay circuits to control the switches instead of the mechanical controls herein illustrated.

In Figs. 3 to 5 inclusive I have eliminated the showing of a casing or cover for the switching mechanism and have shown this mechanism as mounted upon a backing plate 26 with which the cover 25 may be associated in any convenient manner. The backing plate is adapted to be secured directly to the forward face of the dash board 13 by screws or other appropriate securing devices passed through openings 27 in the backing plate. The side edges of the backing plate near the upper end of the latter are struck upwardly to define a pair of aligned bifurcated ears 28 adapted to receive the ends of a metallic shaft 29 mounted eccentrically in an approximately cylindrical block 30 of insulating material. Shaft 29 is accommodated in a groove 31 in one side of the block 30, and the block is cut away exteriorly, providing an arcuate longitudinally extending pocket 32 at one side which communicates with the groove for the shaft 31. The ends of the shaft 29 are threaded as at 32 for the accommodation of clamping thumb nuts 33 which urge gaskets 34 against the ears 28 and serve to effectively clamp the block 30 to the backing plate 26.

Extending longitudinally of one side of the block 30 is a bar 35 of insulating material. This bar is secured to the block by a series of screws 36 mounting nuts 37 and 38 which serve as binding posts for the electrical connections to the signal lights.

As best seen in Fig. 6, the shaft 29 is transversely severed to define an independent shaft section 29ª. The wing nuts 33 serve as binding posts for lead wires 39 and 40 respectively running to the battery 41. It will be noted that the conductor 40 from the short section 29ª of the shaft 29, includes a switch 42 which in practice is the tail light switch of the vehicle.

The block 30 is encircled by a cylindrical metal sleeve 43, formed with a longitudinal slot 44 to accommodate the binding post bar 35. Integral with the sleeve 43 are a plurality of parallel radially extending metallic sleeves 45 which serve as guides for plungers 46. The plungers 46 include reduced inner ends 47 encircled by springs 48 which tend to maintain the plungers in the position of Fig. 5. When one of the plungers is forced inwardly by a mechanism about to be described, it moves an associated spring finger 49 electrically connected to a screw 36 into engagement with a generally similar finger 50 in electrical contact with the shaft 29. Thus, as seen in Fig. 6, when one of the plungers 46 is shifted in the direction of the arrows, it will place the battery 41 in connection with one of the signal lights.

A series of bell crank levers 52 are fulcrumed on a common pivot bar 53 and are guided for vertical movement in aligned slots in the plate which carries the pivot bar. A series of levers 55 have their twisted ends 56 mounted on a second pivot bar 57. Pivot bar 57 is also mounted in the plate 54 at a greater distance from the base plate 26 than the bar 53. The bell crank levers include short angular ends 58 disposed in the path of the plungers 46 and limiting the outward movement of the plungers under the influence of their springs 48.

Means is provided whereby the rocking movement of one of the levers 55 to the dotted line position of Fig. 4 will rock an associated bell crank lever 52 to the dotted line position of Fig. 4, thereby forcing an associated plunger 46 inwardly and moving a switch finger 49 into engagement with its co-operating finger 50. One means of operative connection between the bell crank levers and the levers 55, is seen in Fig. 4, wherein it will be noted that a rod 59 pivotally connected to the longer end of bell crank 55 passes freely through an opening 60 in the lever 55. An adjustable nut 61 is mounted on the threaded end 62 of the rod 59, and a coiled spring 63 encircles the rod between the nut and a gasket 64 bearing against the face of lever 55. The spring 63 acts on the lever 55 to normally retain it in the full line position of Fig. 4, but when the lever is moved to the dotted line position of Fig. 4 against the action of its spring, the spring and rod afford a yieldable connection between lever 55 and bell crank 52, so that the bell crank is rocked to its dotted line position in Fig. 4, a plunger forced inwardly, and a circuit closed. The above description of the connection between one lever 55 and its associated bell crank 52 applies to all of the levers 55 and their associated bell cranks. In every instance rocking movement of a lever 55 away from the plate 26 will cause an associated bell crank to force a plunger 46 inwardly and close one of the signal light circuits.

In addition to the plunger operating levers 55, I employ a supplemental means for selectively operating the plungers 46 which control the "right" and "left" signals. This mechanism as best seen in Figs. 3 and 4 consists of a lever 65 pivoted on a stud 66 in the plate 26 and having a slot and pin connection at 67 with an upstanding finger 68 rigid with a transversely slidable cam bar 69 mounted in a guideway 70 adjacent the plate 54 which carries the pivot bar 53 and 57. The cam bar 69 carries a pair of operating cams 71$^b$ and 71$^a$. Sliding movement of the cam bar to the right in Fig. 3 will cause cam 71$^a$ to elevate the lever 52 which controls the lighting circuit for the "right" signal light, while movement of the cam bar to the left will cause cam 71$^b$ to elevate the lever 52 which controls the "left" signal light. I thus have two independent operating means for controlling the "right" and "left" signals. Lever 67 is manually controlled as will be later described, to act through the levers 52 and throw the plungers for the "right" and "left" signals, while the levers 55 may be controlled independently of the cam bar 69 by a pedal mechanism to be later described.

Figure 2:
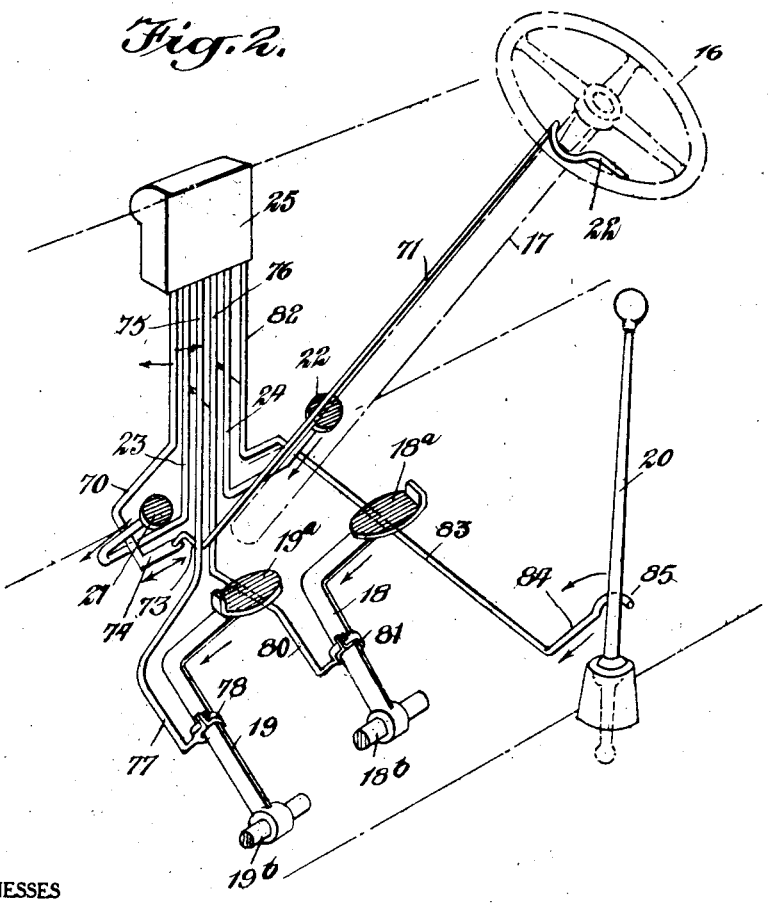
Fig. 2 is a somewhat diagrammatic perspective view of the control reverse for the signal switches showing the manner in which these levers are associated with the usual foot pedals, gear shift lever and steering wheel of a car.

The means for mechanically operating the levers 55 to close the various signal circuits, is best seen in Figs. 1 and 2. Pedals 21 and 22 are each directly connected to the members 23 and 24 which in turn are rigidly connected to the levers 55 for the "right" and "left" signal lights in any suitable manner (not shown). As pedal 21 or pedal 22 is manually depressed, the members 23 and 24 will be swung forwardly at their lower ends, thereby rocking associated levers 55 to close the signal circuits. The supplemental lever 65 for operating the "right" and "left" signals is connected to a lever 70 adapted to be laterally shifted for the purpose of actuating the cam bar 69. As best seen in Fig. 2, a rock shaft 71 mounted on the steering wheel column 17 includes a crank arm extension 72 at the wheel, and a crank arm extension 73 at the base of the column engaged with an angular extension 74 of lever 70. Movement of the crank arm 72 in either direction will rotate the shaft 71, and through the intermediacy of crank arm 73 impart lateral movement to the lever 70 which is rigid or integral with the lever 65. Thus, the "right" and "left" signals may be selectively manually or pedally controlled either from the crank arm 72 at the steering wheel or from the pedals 21 and 22. It may be noted at this point that the levers such as the levers 70, 23, 24 etc., are all disposed beneath the floor board and in front of the dash board of the car, so that they are concealed from view, and not subject to injury by accidental contact with the driver's foot.

The construction of the levers 75 and 76 for operating the levers 55 for the "stop" and "slow" signal circuits are substantially the same. Lever 75 includes an angular rearward extension 77 disposed under the floor boards of the car and slidably connected to the clutch pedal lever 19 by a collar 78. A similar extension 80 of the lever 76 is connected to the brake pedal lever 18 by a collar 81. Thus, depression of either the clutch pedal or brake pedal swings the lever 75 or 76 forwardly, these levers being either rigid or integral with associated levers 55 effecting movement of the plungers 46 for the "stop" and "slow" signal light circuits, and the "stop" and "slow" signals are automatically operated in the usual course of throwing the brake and clutch pedals in and out.

Another of the levers 55 is rigid or integral with a depending lever 82 formed with a downwardly and rearwardly inclined extension 83 terminating in an upwardly extending end 84 which passes through the floor board 12 of the car, and is bent at 85 to partially encircle the lower end of the gear shift lever 20.

In a so-called standard shift gear, movement of the gear shift lever directly forwardly throws the car into reverse gear, and the curved portion 85 of the lever 82 is directly in the path of such movement. Thus, when the lever 20 is swung to put the car in reverse gear, the "reverse" signal light will be operated through the action of the lever 82 and its associated lever train upon the plunger 46$^a$ which controls the switch of the short shaft section 29$^a$.

The manner in which the various plungers 46 and 46$^a$ electrically control the various signal light circuits may be best seen from the wiring diagram. In this diagram it is to be noted that the rear signal light casing 15 has been shown somewhat diagrammatically in rear elevation, while the front signal light casing has been shown diagrammatically in sectional plan. It will be noticed that the front casing is divided into two compartments 90 for the signal lights 91, and is formed both with front windows 92 and rear windows 93, so that when the signal lights 91 have been illumined, they will not only be visible to the drivers of approaching cars, but will advise the driver who operates the signals that the signal circuits are in working condition. The rear windows 93, as a matter of fact, may be made relatively small so that they will simply show small pilot lights, and advise the driver who is operating the signals that the signal lights are lit.

The rear casing is divided into six compartments, each housing a signal light 94, and each bearing on its transparent or translucent window a suitable legend such as "left", "right", "stop", "slow", or "back". All of the signal lights in the rear casing may be grounded through a common ground wire 95.

The tail light is connected to the battery 41 in the usual manner through a conductor 96 controlled by the switch 42. When the switch 42 is closed the tail light is lit, the circuit being from the battery 41 through conductor 96, through the tail light and through the ground wire 95. The usual provision may be made of a window 110 in the bottom of the tail light compartment for illuminating the license plate 111 which is mounted beneath the rear signal casing.

When the tail light is lit, the "reverse" signal or "back" signal circuit is capable of energization when the plunger 46ª is forced inwardly. Inward movement of the plunger 46ª establishes a circuit through the "reverse" signal lamp in parallel with the usual tail light circuit, this circuit being from battery 41 through a conductor 40, shaft section 29ª, switch fingers 50 and 49, conductor 97, reverse signal lamp 94 and ground wire 95. When the plunger 46 controlling the "slow" signal light is operated, a circuit will be established from the battery 41 through conductor 39, rod 29, switch fingers 49 and 50, conductor 98, "slow" signal light 94 and ground wire 95. A similar circuit is established upon operation of the plunger 46 of the "stop" signal light circuit, except that the switch 49, 50 is connected to the "stop" signal light through a conductor 99.

The manner in which the plunger 46 for operating the front and rear "right" signals may be selectively controlled either manually or pedally, has been previously described. In either instance, movement of the plunger to switch closing position will establish parallel circuits through the front and rear "right" signals. The circuit from the switch 49, 50, to the signal lights is through a lead 100 to a pair of branch leads 101, 102 running to the rear and forward signal lamps respectively. The rear signal lamp is grounded through the wire 95, and the circuit through the forward lamp is grounded at 103. The lead from the switch 49, 50 of the "left" signal lights has been numbered 104. This lead divides into a pair of conductors 105, 106 to the forward and rear "left" signal lights, and the forward and rear lights are grounded through 103 and 95 respectively.

It will be apparent that the showing of the present invention is in many respects almost diagrammatic, and that the particular structural details involved in properly attaching the signal light casings to the mud-guards of the car, or mechanically controlling the movement of the levers 55, is subject to a wide variety of variations. The location of the switch casing 25 may be changed to suit the particular requirements of the trade, and if the switches 49, 50 are closed through relay circuits instead of by mechanical means, the switch casing 25 may be mounted in any part of the car.

When building signal systems such as that described above, in new cars, a number of refinements may be made, such for instance as the housing of the rod 71 in the steering wheel column, and the building of the signal light casings 14 and 15 as integral parts of the mud guards.

While the operation of the device may be understood from the above description, a brief summary of operation is substantially as follows. When the driver of a car wishes to turn it either right or left, he may depress either the "right" or left hand pedal 22 or 21, and will thereby operate the proper signal lights both in the front and rear signal casings 14 and 15. A similar result may be had by manually shifting the crank finger 72 to the right or left. Depression of the brake pedal lever 18 will illuminate the "slow" signal light in the rear signal casing. Depression of the clutch pedal lever 19 will operate the "stop" signal lever in the rear signal casing. The tail light which is also housed in the casing 15 is controlled in the usual way by any suitable switch 42, and when the tail light circuit is closed, movement of the gear shift lever 20 to throw the car into reverse gear will automatically effect illumination of the reverse or backing signal light.

In connection with the depression of the clutch or brake pedal, it may be noted that the yieldable connection between the bell cranks and their levers 55 permits continued depression of the brake or clutch levers after contact has been made at their respective switches. The sliding connection between the brake and clutch pedal levers and associated collars 78 and 81 is to permit movement of the collars along the brake pedals after a contact has been made, and the pedals are further depressed.

I may find it desirable to use signal casings on both of the front mud guards, and to divide these casings not only into the signal light compartments illustrated, but in compartments for port and starboard running lights. The windows of the red and green running lights may be disposed at any suitable angle to properly screen the running lights from cars approaching on the port or starboard quarter.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. In a switch, a backing plate, a conductive terminal rod supported on and spaced from the plate, a block of insulating material carried by the rod, a cutaway in said block to expose a contact carried by the rod, a second terminal mounted in the block and insulated thereby from the rod, a contact finger connected to the terminal and normally spaced from the first mentioned contact, a sleeve associated with the block, and a pushbutton sliding in the sleeve adapted when forced inwardly to move the finger into engagement with the contact and close a circuit, said sleeve being integral with a split shell embracing the block.

2. In a switch, a backing plate, a conductive terminal rod supported on and spaced from the plate, a block of insulating material carried by the rod, a cutaway in said block to expose a contact carried by the rod, a second terminal mounted in the block and insulated thereby from the rod, a contact finger connected to the terminal and normally spaced from the first mentioned contact, a sleeve associated with the block, and a pushbutton sliding in the sleeve adapted when forced inwardly to move the finger into engagement with the contact and close a circuit, said sleeve being integral with a split shell embracing the block, the block including a lateral projection extending between the edges of the shell and carrying the second terminal.

3. In a switch, a backing plate, a conductive terminal rod supported on and spaced from the plate, a block of insulating material carried by the rod, a cutaway in said block to expose a contact carried by the rod, a second terminal mounted in the block and insulated thereby from the rod, a contact finger connected to the terminal and normally spaced from the first mentioned contact, a sleeve associated with the block, and a pushbutton sliding in the sleeve adapted when forced inwardly to move the finger into engagement with the contact and close a circuit, the ends of the rod extending beyond the ends of the block, bifurcated ears rising from the backing plate and receiving the rod ends and binding nuts on the rod ends.

4. In a switch, a backing plate, a conductive terminal rod supported on and spaced from the plate, a block of insulating material carried by the rod, a cutaway in said block to expose a contact carried by the rod, a second terminal mounted in the block and insulated thereby from the rod, a contact finger connected to the terminal and normally spaced from the first mentioned contact, a sleeve associated with the block, and a pushbutton sliding in the sleeve adapted when forced inwardly to move the finger into engagement with the contact and close a circuit, the rod ends projecting beyond the ends of the block, and ears rising from the backing plate with which the rod ends are detachably engaged.

5. A switch unit adapted to be attached to a suitable support including a block of insulating material, a split sleeve encircling the block, a lateral projection on the block disposed between the edges of the sleeve and terminals attached to the projecting portion of the block, said block being recessed at one side and contact fingers connected to the terminals disposed in the recess, sleeves projecting laterally from the split sleeve and pushbuttons in the sleeves engageable with the fingers, a terminal rod mounted in the block, insulated from the first mentioned terminals and electrically connected to contacts adapted to be closed by said fingers as the pushbuttons are thrust inwardly.

6. A unit as set forth in claim 5, and wherein projecting ends of the terminal rod afford means for attachment to a support.

7. A unit as set forth in claim 5, wherein the block projection prevents rotary movement of the sleeve and the rod is mounted eccentrically of the block.

8. In a switch, a backing plate, a pair of relatively movable contacts carried by the plate and a spring opposed pushbutton for closing the contacts, in combination with pushbutton operating means including a bell crank rockably mounted on the plate and including an end camming against the pushbutton when the bell crank is rocked, and a tilting lever yieldably connected to the other end of the bell crank.

WILLIAM H. KIRBY.